United States Patent [19]

Smith

[11] Patent Number: 5,153,911
[45] Date of Patent: Oct. 6, 1992

[54] WEATHERPROOF TELEPHONE TERMINAL APPARATUS

[75] Inventor: Thomas J. Smith, Bay Shore, N.Y.

[73] Assignee: TII Industries, Inc., Copiague, N.Y.

[21] Appl. No.: 819,986

[22] Filed: Jan. 13, 1992

[51] Int. Cl.⁵ .......................... H01R 4/24; H04M 9/00
[52] U.S. Cl. ................... 379/399; 379/412; 439/395; 361/119
[58] Field of Search ............... 379/399, 412, 441, 442, 379/397; 361/119, 356; 439/389, 395, 402, 426, 435, 399, 718

[56] References Cited

U.S. PATENT DOCUMENTS

| 4,624,514 | 11/1986 | Smith | 379/412 |
| 4,729,059 | 3/1988 | Wang | 379/412 X |
| 4,790,770 | 12/1988 | Klaiber | 439/395 |
| 4,820,190 | 4/1989 | Humphrey | 439/395 |
| 4,822,297 | 4/1989 | Prince et al. | 439/399 X |
| 4,853,960 | 8/1989 | Smith | 361/119 X |
| 4,907,986 | 3/1990 | Muller | 379/412 X |
| 4,949,376 | 8/1990 | Nieves et al. | 379/399 |
| 4,988,311 | 1/1991 | Tunzola | 439/389 X |

Primary Examiner—James L. Dwyer
Assistant Examiner—M. Shehata
Attorney, Agent, or Firm—Sachs & Sachs

[57] ABSTRACT

A weatherproof telephone terminal apparatus includes a terminal assembly having a pair of terminal members included therein suitable for splicing insulated telephone wires of the same or different wire sizes in a single housing which is impervious to atmospheric conditions and may be used indoors and outdoors and may be installed in a clamshell-like housing, thereby eliminating the need for conventional splicing techniques.

17 Claims, 4 Drawing Sheets

WEATHERPROOF TELEPHONE TERMINAL APPARATUS

BACKGROUND OF THE INVENTION

1. Field of the Invention

The present invention relates to telephone terminal apparatus, and more particularly, to a weatherproof terminal apparatus suitable for indoor and outdoor use, capable of replacing the typical splicing techniques presently in use.

2. Description of the Relevant Art

The art abounds with numerous techniques for splicing wires together and utilizes numerous techniques and methods to insure that a connection be made between two electrically conductive wires of the same and/or different sizes, which after joining maintains good electrical contact therebetween. However, the many techniques known in the prior art are time consuming to accomplish and their reliability over long periods of time, especially when subjected to the atmosphere readily deteriorate.

It is an object of the present invention to provide a relatively low cost reliable and efficient means for splicing two wires together in the field.

It is another object of the present invention to provide a readily installable telephone terminal apparatus for connecting different sized insulated wires together.

It is yet another object of the present invention to provide a reliable rapidly installable splicing apparatus which is essentially impervious to the outside elements.

It is still yet another object of the present invention to provide a telephone terminal apparatus suitable of connecting together, in a reliable manner, insulated electrically conductive wires of different sizes.

It is still yet another object of the present invention to provide a reliable means for splicing wires of the same or different sizes together requiring no special technique or utilization of solder or other conducting medium which must be melted to complete the circuit connection.

Therefore, the present invention provides an apparatus, which overcomes the shortcomings of the prior art and is capable of insuring a reliable connection between a plurality of insulated electrically conductive wires, whether they be of the same or different diameters, in a rapidly made long lasting connection, which is impervious to weather conditions.

SUMMARY OF THE INVENTION

A weatherproof telephone terminal apparatus, according to the principles of the present invention, comprises in combination; a "clamshell-type" housing suitable for encompassing a terminal assembly, which includes a pair of terminal members, the terminal members include a pair of upper housing members and a common lower housing member. The upper housing members are adapted to cooperate with and to be received by the lower housing member and are provided on the top surface thereof with a generally centrally disposed through aperture, a pair of through apertures disposed proximate the edges of the top surface and a pair of side through apertures. The lower housing member is provided with a centrally disposed threaded aperture in alignment with the upper housing member apertures when assembled and at least two additional through apertures. A pair of generally U-shaped electrically conductive contacts, when viewed in cross-section, has the arms thereof provided with at least one slot suitable for receiving an electrically conductive insulated wire therein, with a base thereof provided with a through aperture. A pair of generally L-shaped electrically conductive contacts, when viewed in cross-section, has a through aperture disposed therein. A pair of electrically conductive feedthroughs are inserted into the through apertures of the U-shaped members, the L-shaped members and the lower housing member apertures so that the upper housing members are in alignment and the arms of the L-shaped contacts are in position to be in alignment with the through apertures disposed proximate the edges of the upper housing members. A fastening device, such as a threaded bolt, is adapted to be received into the centrally disposed through aperture of the upper member and be received by the threaded aperture of the lower member, causing the upper and lower member to cooperate and be urged towards each other when the bolt is rotated causing the bottom member to receive the top member, so that when electrically conductive insulated wires are inserted into the side through apertures of the upper housing members into the slots of the U-shaped electrically conductive contacts an electrically conductive path is completed therebetween.

The weatherproof terminal assembly may be utilized without the housing, if so desired, and a bottom cover to protect the connecting links may be utilized in addition to filling the areas around the connecting links and the U-shaped conductive contacts, and the test points appearing on the top surface of the top terminal housing member with a non-conducting grease or resilient epoxy.

The foregoing and other objects and advantages will appear from the description to follow. In the description, reference is made to the accompanying drawing which forms a part hereof, and in which is shown by way of illustration a specific embodiment in which the invention may be practiced.

This embodiment will be described in sufficient detail to enable those skilled in the art to practice the invention, and it is to be understood that other embodiments may be utilized and that structural changes may be made without departing from the scope of the invention.

The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing, in which.

DESCRIPTION OF THE PREFERRED EMBODIMENT

Figure 1:
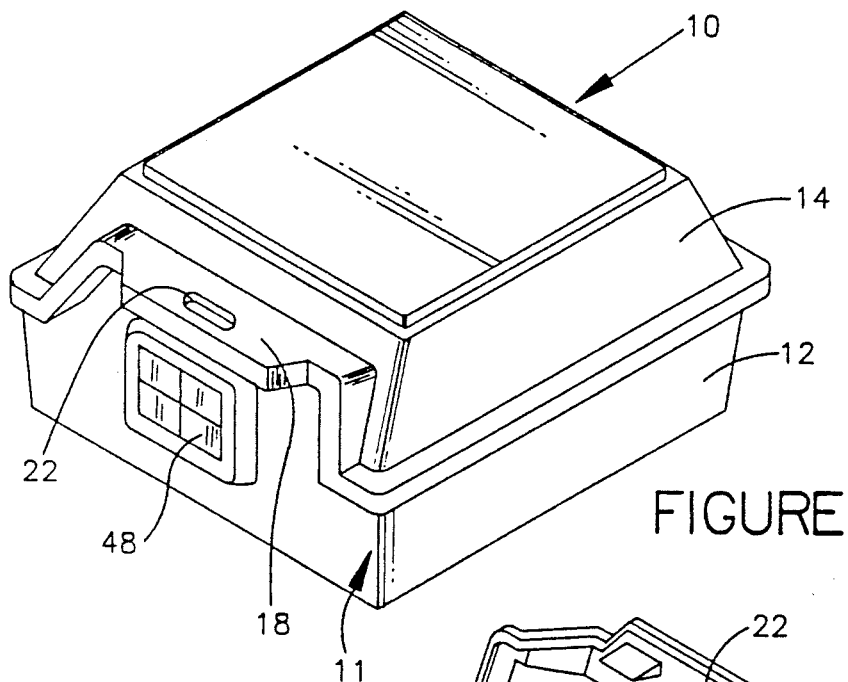
FIG. 1 is an isometric view of the weatherproof telephone terminal apparatus with the cover closed, according to the principles of the present invention.
Figure 2:
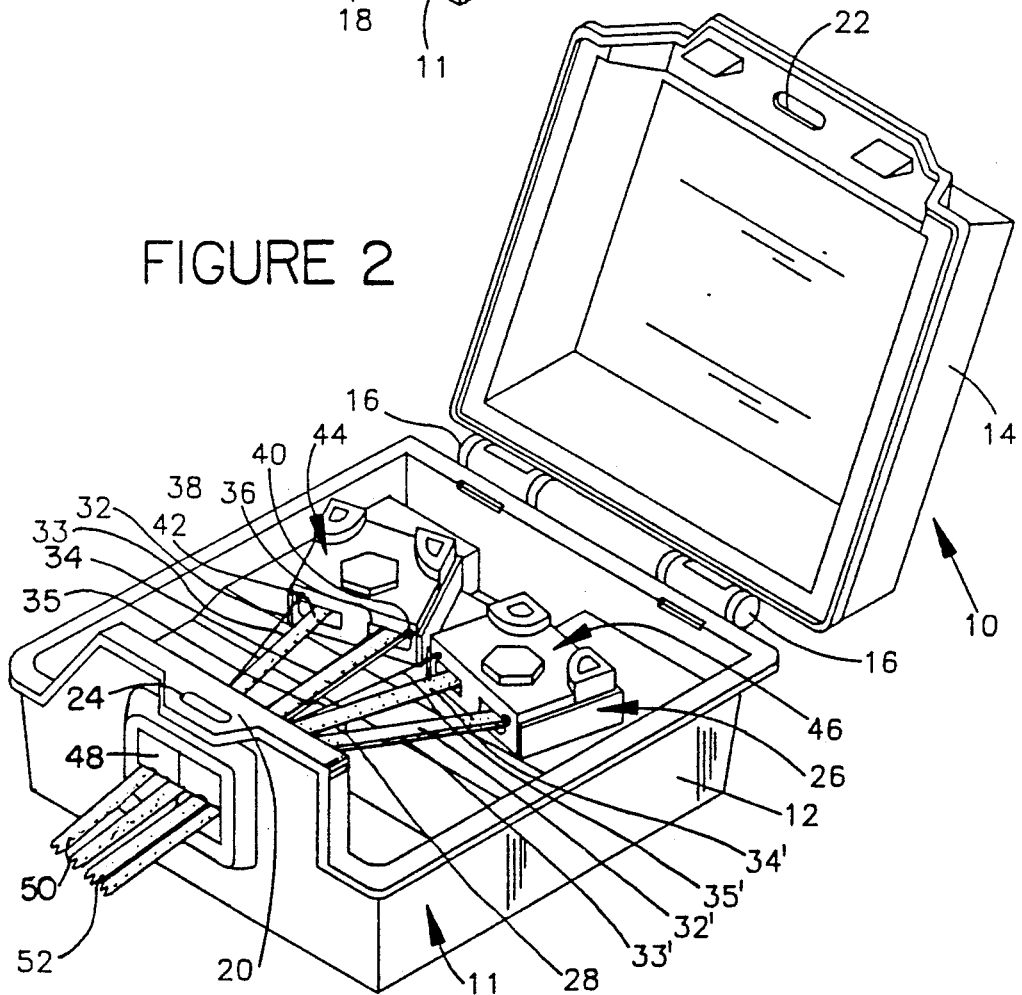
FIG. 2 is an isometric view of the telephone terminal apparatus as shown in FIG. 1 with the housing cover in an open position.

Referring now to the figures, and in particular to FIGS. 1 and 2, there is shown a weatherproof telephone terminal apparatus 10, according to the principles of the present invention, which includes a base 12 and a cover 14 that are hinged in a conventional manner by a pair of hinges 16. The base and cover 12 and 14 are provided with an extending lip portion 18 and 20, respectively, with through apertures 22 and 24 provided therein, respectively, suitable for the insertion of a locking device, not shown, which may be installed by the telephone company thereby preventing unauthorized personnel from entering into the terminal connections. The terminal assembly 26 is disposed within the housing 11 of the apparatus 10 which includes the base 12 and the cover 14 and is readily mounted to a surface, not shown, by the means of screws 28 and 30, shown more clearly in FIG. 3, which may pierce the bottom of the base member 12 and affix it to a vertical or horizontal surface as desired.

Figure 3:
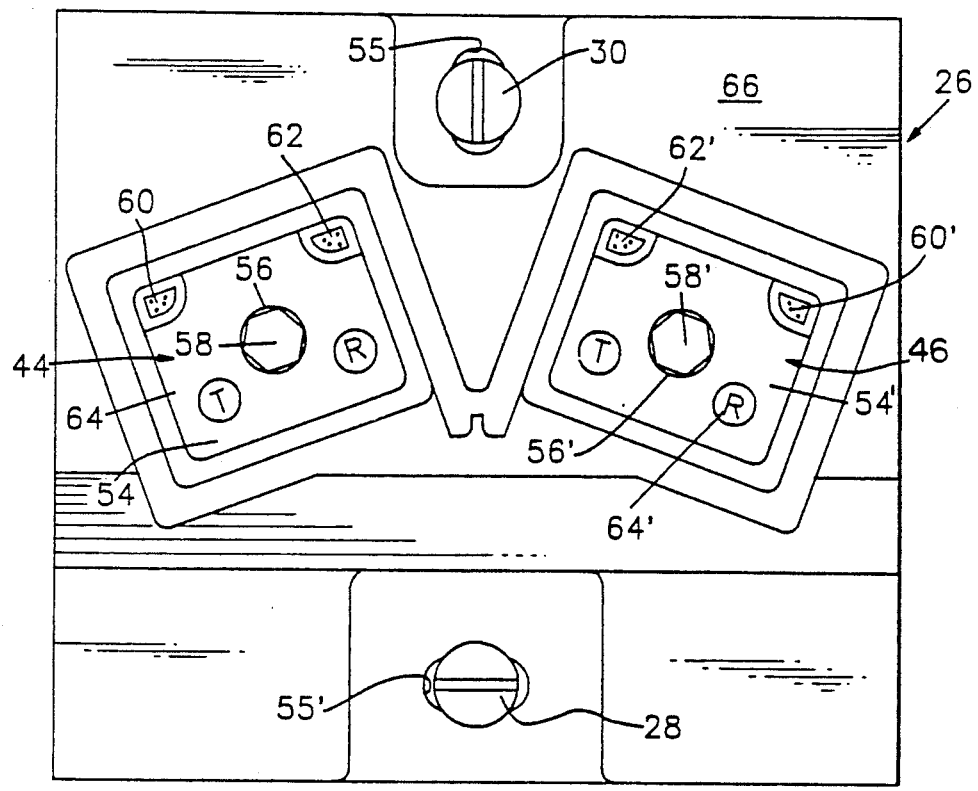
FIG. 3 is a top plan view of the terminal assembly disposed within the housing shown in FIG. 2.

A top plan view of the terminal assembly 26 removed from the terminal apparatus housing 11 is shown in FIG. 3. The terminal assembly 26 is capable of being used without the housing 11 if so desired. The insulated electrically conductive wires 32, 33, 34 and 35 are shown inserted in one of the side, or in this case, front apertures 36 and 38 suitable for accepting relatively large diameter insulated wires with apertures 40 and 42 suitable for accepting relatively smaller diameter insulated wires.

Terminal assembly 26 includes a pair of terminal members 44 and 46, which are essentially identical and will be described hereinafter. Terminal members 44 and 46 have similar construction. Terminal member 44 is designed to receive wires 32, 33, 34 and 35 in apertures 36, 38, 40 and 42. Terminal member 46 is preferably designed to receive wires 32', 33', 34' and 35, in apertures 36', 38', 40' and 42', in the same manner. The electrically conductive wires whether of the same size (diameter) or of different sizes (diameter), as shown, are inserted through a grommet protected aperture 48 prior to being inserted into the apertures of the terminal assembly 26.

Referring now specifically to FIG. 3, an enlarged top plan view of the terminal assembly 26 is shown outside of the housing 11. Screws 30 and 28 inserted through apertures 54 and 56 provide for the mounting of the terminal assembly 26 to any flat surface with or without the use of the housing 11.

Terminal member 44 includes an upper housing member 54 and terminal housing member 46 includes upper housing member 54'. Since terminal member 44 and terminal member 46 are essentially identical the description to follow will refer to terminal member 44 and the components as numbered therein with regard to terminal member 44 will be the same as that for terminal 46 except they will be indicated by a prime placed after the number. Included in the upper housing members 54 and 54' are generally centrally disposed apertures 56 and 56' into which are inserted captive bolts 58 and 58' and two through apertures 60 and 62; and 60' and 62', which function as test receptacles. Indicia may also be included on the top surface 64 and 64' to indicate that the one test receptacle is for the tip circuit and the other test receptacle is for the ring circuit (See FIG. 3).

Figure 4:
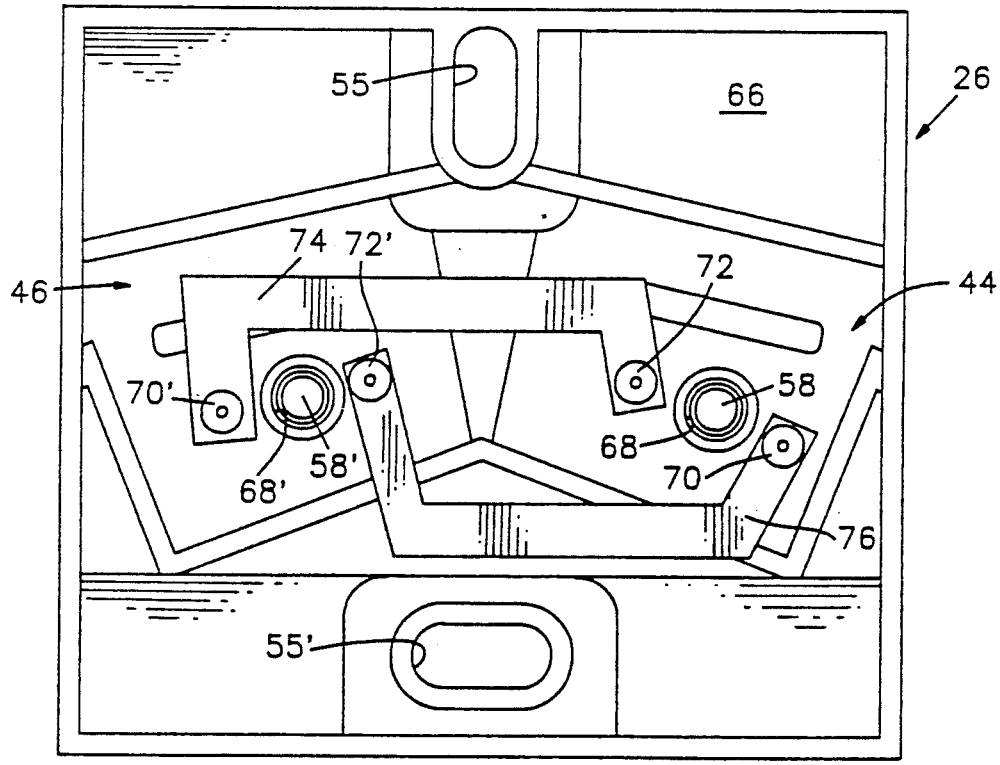
FIG. 4 is a bottom plan view of the terminal assembly showing a typical connection of the connecting links.

Referring now to FIG. 4, which is an enlarged bottom plan view of the terminal assembly 26, where one can easily locate the captive bolts 58 and 58' cooperating with threaded inserts 68 and 68' provided in lower or common base member 66. A pair of electrically conductive feedthroughs 70 and 72; and 70' and 72' extend from the other side of the common base member 66. The function of feedthroughs 70 and 72, and 70' and 72' will be explained hereinafter together with the description of FIG. 8. Suffice it to say at the present time that the electrically conductive feedthroughs may be connected by means of electrically conductive links 74 and 76 (see FIG. 4 and FIG. 8). The conductive links 74 and 76 are shown connected from one electrically conductive feedthrough 70' to conductive feedthrough 72 with the other link 76 being connected from electrically conductive feedthrough 72' to conductive feedthrough 70, however, it is also apparent that the electrically conductive links may also be connected between terminals 70' and 72'; or 70 and 72. The purpose of which will become more apparent when reference is made to the construction of the apparatus shown in FIG. 8.

Figure 5:
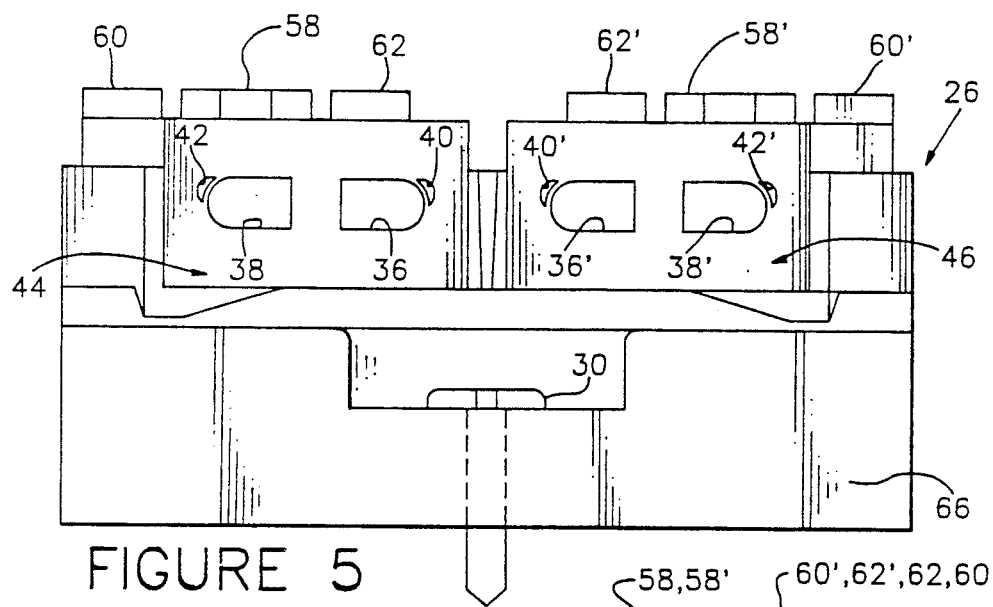
FIG. 5 is a front view in elevation of the telephone terminal assembly.

FIG. 5 is a front view in elevation and is enlarged for ease in determining the components disclosed in FIG. 2.

Figure 6:
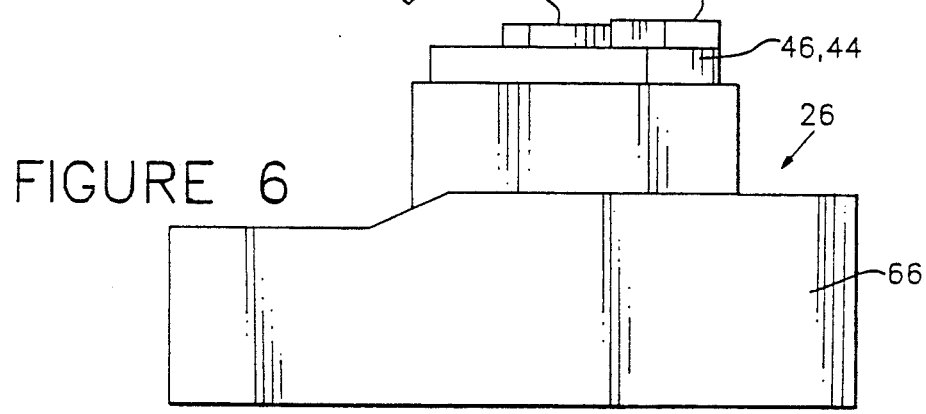
FIG. 6 is a side view in elevation of the telephone terminal assembly.

FIG. 6 is a side view in elevation which is enlarged to more clearly show the location of the components described earlier.

Figure 7:
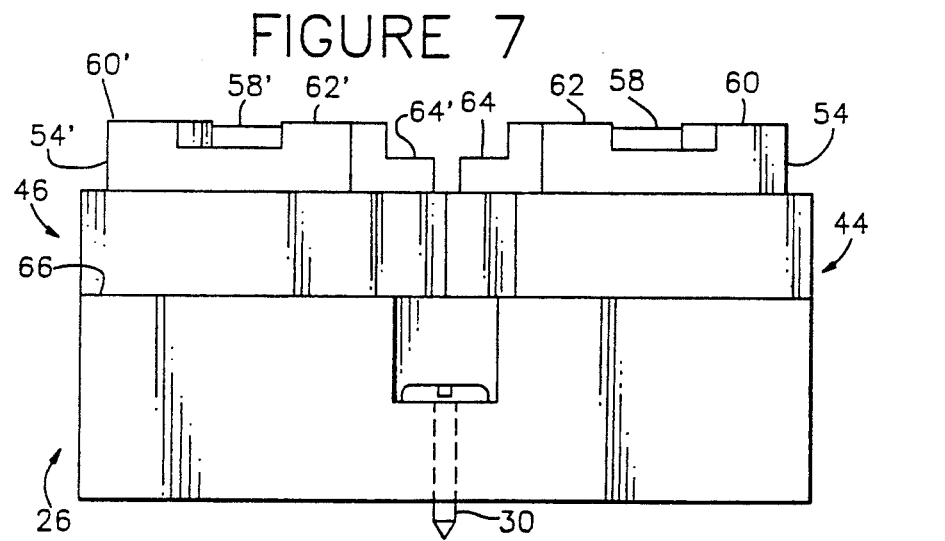
FIG. 7 is a rear view in elevation of the telephone terminal assembly.

FIG. 7 is an enlarged rear view in elevation of the apparatus of the terminal assembly 26 to clarify the configuration of the assembly.

Figure 8A:
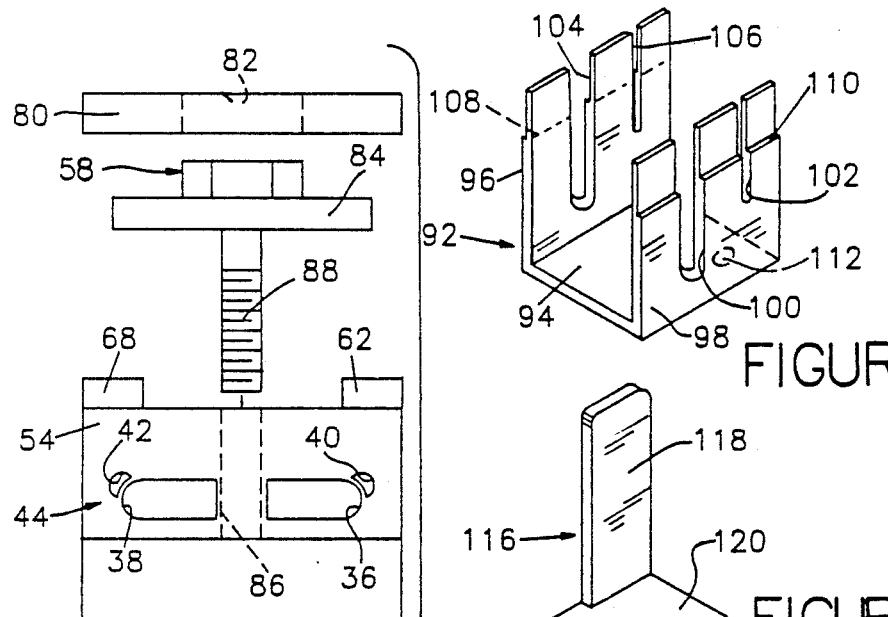
FIG. 8A is an enlarged isometric view of the electrically conductive U-shaped contact as shown in FIG. 8.
Figure 8B:
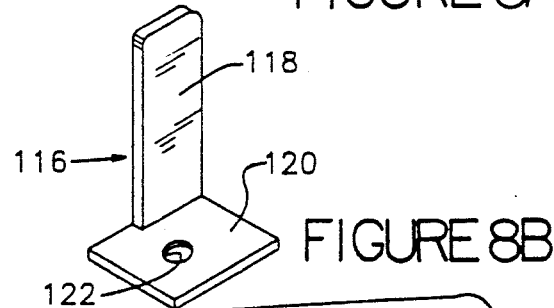
FIG. 8B is an enlarged isometric view of the L-shaped electrically conductive contact shown in FIG. 8.
Figure 8:
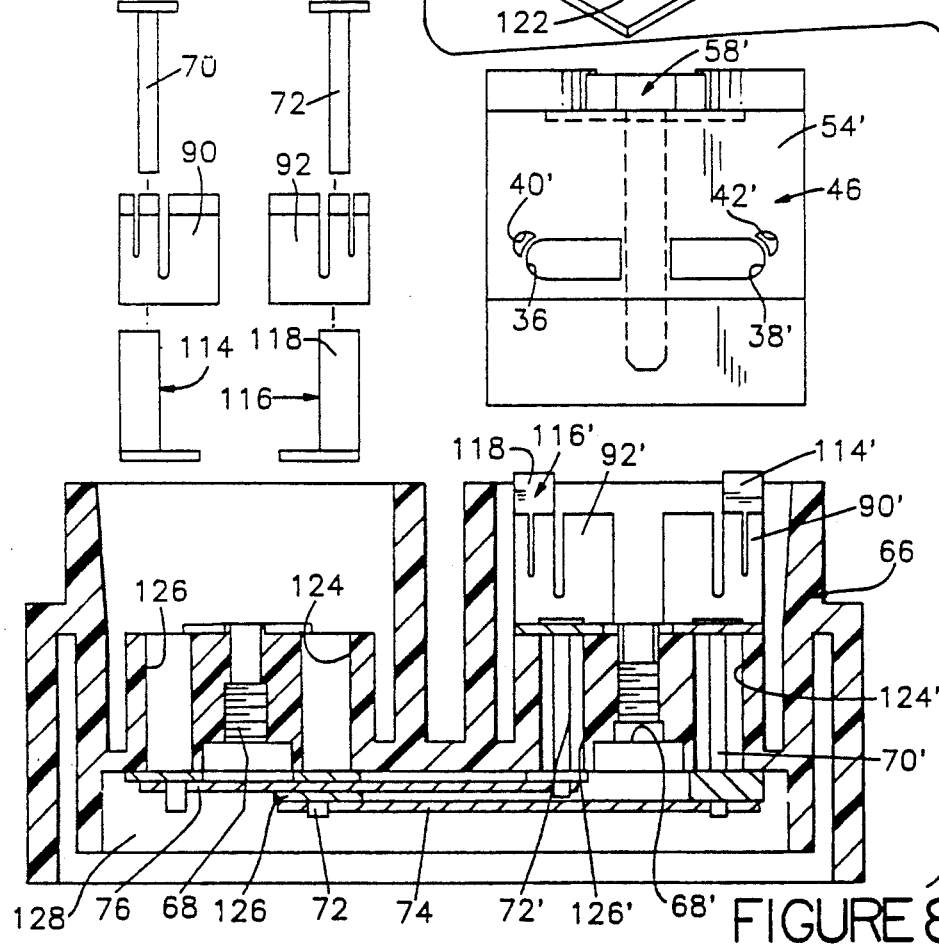
FIG. 8 is a cross-sectional view of the telephone terminal assembly with one terminal upper housing member raised and the other terminal in a completely exploded view so that the assembly thereof may be readily observed.

Referring now to FIG. 8, 8A and 8B, which are enlarged for clarity showing a cross-section taken generally through the center of the terminal members 44 and 46, however, terminal member 44 has been exploded so that one may more readily view the individual components and terminal 46 has been separated so that the upper housing member 54' has been separated from the common base member 66, shown in cross-section, to more readily clarify how the components are assembled.

FIGS. 8A and 8B are isometric enlarged views of members 92 and 116.

The exploded portion of FIG. 8 showing terminal member 44 and its method of assembly may be envisioned by noting that the upper housing member 54 includes a cap portion 80, which is provided with a centrally disposed aperture 82 adapted to fit over bolt head 58 provided with a collar 84, which is set upon the upper housing member 54 provided with an aperture 86 therein suitable for receiving only the threaded portion 88 of the bolt 58. Aperture 86 is merely a clearance hole for the threaded portion 88 of the bolt 58 and once in position then the cap portion 80 is affixed to the upper housing member 54 by means of epoxy or ultrasonic welding, thereby capturing bolt 58 so that it cannot be removed from the upper housing member.

U-shaped members 90 and 92; and 90' and 92' are made of electrically conductive material. U-shaped member 92 is enlarged and shown in isometric fashion in FIG. 8A and it is seen to have a base portion 94 and upwardly extending arms 96 and 98. The arms 96 and 98 are provided with slots 100 and 102, respectively. Arms 96 and 98 are also provided with a ledge 108 and 110, respectively whose function will be described hereinafter. Although slots 100 and 104 are the same width and preferably are larger in width than slots 102 and 106 they provide for intimate electrical conductive contact with insulated wires of different diameters. Although two different sizes are shown, it is obvious to those knowledgeable in the art that the choice of slot thickness is strictly arbitrary and may be chosen for the convenience of the individual using the assembly and the thickness or diameter of the insulated wires to be connected to the terminal assembly 26. The base portion 94 of the U-shaped member 92 is provided with an aperture 112.

L-shaped members 114 and 116 are also electrically conductive, and are preferably made of brass. The L-shaped member 116 is shown greatly enlarged in FIG. 8B. It is seen to have a vertical portion 118 and a base portion 120 that is also provided with an aperture 122.

When assembled the conductive feedthrough 72 is inserted through the aperture 112 of U-shaped member 92, through aperture 122 of L-shaped member 114 and then through the aperture 124 provided in the common base member 66 extending through aperture 124 until it exits and is held in place by a cap locking washer 126 and/or locking aperture provided in the conducting link 74. In a like manner conductive feedthrough 70 holds U-shaped member 90 and L-shaped member 114 in place when it is inserted into aperture 126 of base member 66 and it may also have conductive link 76 connected to it in a conventional manner. In a like manner U-shaped member 92', L-shaped member 116, and housing 66 and also may be terminated in a locking washer 126' and may include the conductive link 76. Conductive feedthrough 72 and 70' may be used in a similar manner to assemble the remaining conductive contacts of the terminal assembly.

In operation, the upper housing member 54 of terminal member 44 is placed above the lower member 66 and the threaded portion 88 of bolt 58 will engage the threaded insert 68 provided in base member 66 so that the upper member 44 will start to engage and cooperate with base member 66 as bolt 58 is rotated in a clockwise direction.

It is to be understood that when reference is being made to the components in one terminal member the same members shown with the prime numerals are assembled and function in the same manner.

The wires that the telephone company chooses to connect together may be inserted, via the grommeted aperture 48, if the housing 11 is utilized, or the wires may be inserted directly into the openings 38 and 42, opening 38 being able to accommodate a larger diameter insulated conductive wire and opening 42 being able to accommodate a thinner and smaller gauge insulated conductive wire. If the purpose for the connection is just to splice these two wires together, then the shorting links would not be utilized. Likewise, wires of different diameters may be inserted in aperture 36 and 40 in accordance with their diameters.

By rotating bolt 58 in a clockwise direction the upper housing 54 would move in a downwardly direction and because of the internal construction of the upper housing members 44 and 46 causes the wires to be urged in a downwardly direction causing the slots 100, 104, 102 and 106 to cut through the insulation of the wires in two places as they are urged in a downwardly direction and thus, since they have been cut in two places along their length provide excellent electrically conductive contact with the U-shaped electrically conductive member 90 completing an electrically conductive path. An internal ledge is provided in the upper housing member 54 that cooperates with the ledges 106 and 110 provided on the conductive member 92 to prevent the wires from being urged to fall too far in a downwardly direction where the wires might shear rather than just make electrically conductive contact with the U-shaped member 90.

The vertical portion 118 of the L-shaped member 116 extends upwardly into the aperture 62 forming the test terminal described earlier. The vertical portion of L-shaped member 114 extends upwardly into receptacle 60 forming the other test point. As presently shown, the test points 60 and 62 are isolated. One being utilized for the tip telephone circuit and the other being utilized for the ring telephone circuit.

It is obvious that by using an elongated U-shaped member 90 the length of u-shaped members 90 and 92 or shorting link connecting conducting feedthroughs 70 and 72 all the wires inserted through apertures 36, 38, 40 and 42 may be shorted together taking the place of a conventional splice, if it is so desired. In the like manner, the other terminal member 46 may be connected in either the same manner or any other manner desired by the person utilizing the apparatus. It is also possible to short all the electrically conductive feedthroughs 70, 72, 70' and 72' together so that the terminal apparatus may splice a multitude of wires together. One may also change the diameter of the slots and apertures in the U-shaped members to accommodate just about any wire size desired. It is also not absolutely necessary to make both terminal members accommodate the same size of insulated conductive wires, however it is probably best utilized by indicating somewhere on the terminal assembly which wire sizes the inserts are adapted to accommodate.

A non-conducting grease or gel 128 may be placed in the air space surrounding the conductive links 74 and 76 and it may also be placed in the test terminals 60, 62, 62' and 60' as well as between the upper housing members 44 and 46 and the base member 66 prior to inserting the wires. Once the wires are inserted into the apertures and the upper members are urged toward the base member 66, the electrically conductive contacts 90, 92, 90' and 92' will still cut the insulation on the wires inserted therein and make electrical conductive contact with the conductive portion of the wires, thereby protecting the connections from the outside atmosphere. Since the non-conducting grease or gel is generally inert, the connection once made will remain reliable.

Hereinbefore has been disclosed an effective telephone terminal device capable of providing reliable connections for a multitude of wire sizes and may readily be used to replace a conventional splice. It will be understood that various changes in the details, materials, arrangements of parts and operating conditions which have been herein described and illustrated in order to explain the nature of the invention may be made by those skilled in the art within the principles and scope of the instant invention.

Having thus set forth the nature of the invention, what is claimed is:

1. A weatherproof telephone terminal apparatus comprising, in combination:
   a) housing means, said housing means being hollow and suitable for encompassing a terminal assembly;
   b) said terminal assembly including a pair of terminal members, said terminal members including;
      i) a pair of upper housing members, each having a top surface and edges and a common lower housing member, said upper housing members being adapted to cooperate with and be received by said lower housing member, each of said upper housing members being provided on the top surface thereof with a generally centrally disposed through aperture, a pair of through apertures disposed proximate the edges of said top surface and a pair of side through apertures, said lower housing member being provided with a pair of threaded apertures in alignment with said generally centrally disposed through apertures of said upper housing member when assembled and at least two additional feedthrough apertures,
      ii) a pair of generally U-shaped electrically conductive contacts, when viewed in cross-section, having a pair of arms and a face with said arms thereof of each being provided with at least one slot adapted to receive an electrically conductive insulated wire therein and said base thereof being provided with a through aperture,
      iii) a pair of generally L-shaped electrically conductive contacts, when viewed in cross section, having a base portion, said L-shaped contact base portion having a through aperture disposed therein, and
      iv) a pair of electrically conductive feedthroughs adapted to be inserted into said through apertures of said U-shaped members, said L-shaped members and said lower housing member apertures so that said upper and lower housing members are in alignment and said arms of each said L-shaped contacts are positioned to be in alignment with said pair of feedthrough apertures disposed proximate said edges of each said upper housing member; and
   c) fastening means adapted to be inserted into each of said generally centrally disposed through apertures of said upper housing members and be received by one of said pair of threaded apertures of said lower housing member and cooperate therewith for urging said top housing members to be received by said bottom housing member;
   wherein, said electrically conductive insulated wires are inserted into said side through apertures of said upper housing members into said slots of said U-shaped contacts an electrically conductive path is completed therebetween upon urging said upper housing members and said lower housing member together, wherein, said U-shaped contacts severs insulation on said insulated wire.

2. A weatherproof telephone terminal apparatus according to claim 1 further including locking means for locking said housing means so that only authorized persons may open it.

3. A terminal assembly comprising:
   a) pair of terminal members, said terminal members including:
      i) a pair of upper housing members, each having a top surface and edges and a common lower housing member, said upper housing members being adapted to cooperate with and be received by said lower housing member, each of said upper housing members being provided on the top surface thereof with a generally centrally disposed through aperture, a pair of through apertures disposed proximate the edges of said top surface and a pair of side through apertures, said lower housing member being provided with a pair of threaded apertures in alignment with said generally centrally disposed through aperture of said upper housing member when assembled and at least two additional feedthrough apertures,
      ii) a pair of generally U-shaped electrically conductive contacts, when viewed in cross-section, having a pair of arms and a base with said arms thereof of each being provided with at least one slot adapted to receive an electrically conductive insulated wire therein and said base thereof being provided with a through aperture,
      iii) a pair of generally L-shaped electrically conductive contacts, when viewed in cross-section, having a base portion, said L-shaped contact base portion, having a through aperture disposed therein, and
      iv) a pair of electrically conductive feedthroughs adapted to be inserted into said through apertures of said U-shaped members, said L-shaped members and said lower housing member apertures so that said upper and lower housing members are in alignment and said arms of said L-shaped contacts are in position to be in alignment with said pair of feedthrough apertures disposed proximate said edges of each said upper housing member; and
   b) fastening means adapted to be inserted into each of said generally centrally disposed through apertures of said upper housing members and be received by one of said pair of threaded apertures of said lower housing member and cooperate therewith for urging said top housing members to be received by said bottom housing member;
   wherein, when electrically conductive insulated wires are inserted into said side through apertures of said upper housing members into said slots of said U-shaped contacts an electrically conductive path is completed therebetween upon urging said upper housing members and said lower housing member together, wherein, said U-shaped contacts severs insulation on said insulated wire.

4. A weatherproof terminal assembly according to claim 3, wherein said through apertures disposed proximate the edges of said upper housing are selected with a non-conducting means, which may be pierced with a test probe and function as test terminals.

5. A terminal assembly according to claim 3, wherein said U-shaped conductive arm slots are of different widths adapted to receive different sizes of electrically conductive insulated wires therein.

6. A terminal assembly according to claim 3, wherein said U-shaped conductive arm slots are all the same width adapted to receive the same size of electrically conductive insulated wires therein.

7. A terminal assembly according to claim 3, wherein said fastening means comprises a threaded bolt, said bolt being captive within said upper housing members.

8. A terminal assembly according to claim 3, wherein said arms of said U-shaped electrically conductive contacts having distal extending ends, said ends being provided with ledges adapted to cooperate with a ledge provided on said upper housing members to prevent said upper housing members from shearing said electrically conducting wires.

9. A terminal assembly according to claim 3, wherein said U-shaped electrically conductive contacts pierce the insulation of each of said electrically conductive wires in at least two places.

10. A weatherproof terminal assembly according to claim 3 further including housing means, said housing means being hollow and encompassing said terminal assembly.

11. A weatherproof telephone terminal apparatus according to claim 10 further including locking means for locking said housing means so that only authorized persons may open it.

12. A terminal assembly according to claim 3, further including electrically conductive connecting link means for connecting one of said electrically conductive feedthroughs to another one of said electrically conductive feedthroughs.

13. A terminal assembly according to claim 12, wherein said connecting link means is connected between one of said electrically conductive feedthroughs to the other electrically conductive feedthrough disposed within the same upper housing member.

14. A terminal assembly according to claim 12, wherein said connecting link means is connected between one of said electrically conductive feedthroughs in one upper housing member to the other electrically conductive feedthrough disposed within the other upper housing member.

15. A weatherproof terminal assembly according to claim 12, further including non-conducting means, said non-conducting means being applied to fill any air space occurring between said upper housing members and said lower housing member and any air space surrounding said connecting link means.

16. A terminal assembly according to claim 12, further including a cover means for covering any air space surrounding said connecting link means.

17. A weatherproof terminal assembly comprising:
 a) pair of terminal members, each of said terminal members including;
  i) a pair of upper housing members each having a top surface and edges and a common lower housing member, said upper housing members being adapted to cooperate with and be received by said lower housing member, each of said upper housing members being provided on the top surface thereof with a generally centrally disposed through aperture for receiving a captive bolt therein, a pair of through apertures disposed proximate the edges of said top surface and a pair of side through apertures for receiving electrically conductive insulated wires therein, said lower housing member being provided with a pair of threaded apertures in alignment with said generally centrally disposed through apertures of said upper housing member for receiving and cooperating with said captive bolt when assembled and at least two additional feedthrough apertures,
  ii) a pair of generally U-shaped electrically conductive contacts, when viewed in cross-section, having a pair of arms and a base with said arms thereof of each being provided with at least one slot and a ledge disposed proximate the distal extending ends of said arms adapted to receive an electrically conductive insulated wire therein and the base thereof being provided with a through aperture,
  iii) a pair of generally L-shaped electrically conductive contacts, when viewed in cross-section, having a base portion, said L-shaped contact base portion having a through aperture disposed therein, and
  iv) a pair of electrically conductive feedthroughs adapted to be inserted into said through apertures of said U-shaped member, said L-shaped members and said lower housing member apertures so that said upper and lower housing members are in alignment and said arms of said L-shaped members are in position to be in alignment with said pair of feedthrough apertures disposed proximate the edges of each said upper housing member; and
 b) connecting link means, said connecting link means being connected between one electrically conductive feedthrough and another one of said electrically conductive feedthroughs; and
 c) a captive bolt adapted to be inserted into each of said generally centrally disposed through apertures of said upper housing members and be received by one of the threaded apertures of said lower housing member and cooperate therewith for urging said top housing members to be received by said bottom housing member when rotated in a clockwise direction.

* * * * *

UNITED STATES PATENT AND TRADEMARK OFFICE
CERTIFICATE OF CORRECTION

PATENT NO.   : 5,153,911
DATED        : October 6, 1992
INVENTOR(S)  : Thomas J. Smith It is certified that error appears in the above—identified patent and that said Letters Patent is hereby corrected as shown below:

Column 7, line 29; delete "face" and insert -- base --.

Signed and Sealed this

Fifteenth Day of March, 1994

Attest:

BRUCE LEHMAN

Attesting Officer            Commissioner of Patents and Trademarks